(12) United States Patent
Sharma

(10) Patent No.: US 9,939,923 B2
(45) Date of Patent: Apr. 10, 2018

(54) SELECTING EVENTS BASED ON USER INPUT AND CURRENT CONTEXT

(71) Applicant: MICROSOFT TECHNOLOGY LICENSING, LLC, Redmond, WA (US)

(72) Inventor: Manoj Sharma, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/745,320

(22) Filed: Jun. 19, 2015

(65) Prior Publication Data

US 2016/0370879 A1 Dec. 22, 2016

(51) Int. Cl.
*G06F 3/0484* (2013.01)
*G06F 3/0362* (2013.01)
(Continued)

(52) U.S. Cl.
CPC .......... *G06F 3/0312* (2013.01); *G06F 3/015* (2013.01); *G06F 3/017* (2013.01); *G06F 3/0362* (2013.01); *G06F 3/0485* (2013.01); *G06F 3/04842* (2013.01); *G06F 3/04847* (2013.01); *G06F 3/04883* (2013.01); *G06F 17/30528* (2013.01); *G06F 17/30994* (2013.01); *G06F 17/30997* (2013.01); *G06Q 10/109* (2013.01); *H04M 1/72569* (2013.01); *H04M 1/72566* (2013.01)

(58) Field of Classification Search
CPC .............. G06F 3/04842; G06F 3/0482; G06F 3/04847; G06F 3/0488; G06F 3/04845; G06F 3/017; G06F 3/0362; G06F 17/30528; G06F 17/3084; G06F 9/542; G06Q 10/10; G06Q 10/1095; G06Q 30/0261; G06K 2009/00738
See application file for complete search history.

(56) References Cited

U.S. PATENT DOCUMENTS

| 6,415,298 B1 | 7/2002 | Oesterer et al. |
| 6,556,222 B1 * | 4/2003 | Narayanaswami .. G04G 9/0064 368/295 |

(Continued)

FOREIGN PATENT DOCUMENTS

WO 2013041345 A1 3/2013

OTHER PUBLICATIONS

Bonnington, Christina, "Pebble Rethinks its Smartwatch with a Colorful, Easier to Use Model", Published on: Feb. 24, 2015, 9 Pages. Available at: http://www.wired.com/2015/02/pebble-time/.

(Continued)

*Primary Examiner* — Dismery Mercedes

(57) ABSTRACT

Examples of the disclosure determine the current context of a user or a wearable device of the user. User input is received to select one or more of context-dependent events from a plurality of past, current and future events. In some examples, one or more events from the plurality of past, current and future events and a part of the current context are captured by sensors available on the wearable device. Responsive to receiving the user input, one or more of the plurality of events are selected based on the determined current context and a direction of the user input. At least one of the selected one or more of the plurality of events is displayed on the wearable device of the user.

20 Claims, 18 Drawing Sheets

(51) Int. Cl.
*G06F 3/0482* (2013.01)
*G06Q 10/10* (2012.01)
*G06F 3/03* (2006.01)
*G06F 17/30* (2006.01)
*G06F 3/01* (2006.01)
*G06F 3/0485* (2013.01)
*G06F 3/0488* (2013.01)
*H04M 1/725* (2006.01)

(56) References Cited

U.S. PATENT DOCUMENTS

| | | | | |
|---|---|---|---|---|
| 7,710,409 | B2* | 5/2010 | Robbin | G06F 1/1626 345/156 |
| 7,778,118 | B2* | 8/2010 | Lyons | G04G 21/04 368/69 |
| 7,783,645 | B2 | 8/2010 | Hess et al. | |
| 7,788,109 | B2 | 8/2010 | Jakobson et al. | |
| 8,707,186 | B2 | 4/2014 | Kashi | |
| 8,860,674 | B2* | 10/2014 | Lee | G04G 21/08 345/173 |
| 8,892,498 | B2 | 11/2014 | Guanwardana et al. | |
| 9,195,219 | B2* | 11/2015 | Hong | G04G 21/00 |
| 9,612,032 | B2* | 4/2017 | Matas | F24F 11/0012 |
| 9,804,759 | B2* | 10/2017 | Wilson | G06F 3/04845 |
| 2007/0247421 | A1* | 10/2007 | Orsley | G06F 3/0362 345/156 |
| 2009/0077000 | A1 | 3/2009 | Begole et al. | |
| 2009/0265671 | A1* | 10/2009 | Sachs | G06F 3/017 715/863 |
| 2012/0058783 | A1* | 3/2012 | Kim | G06F 1/1626 455/456.2 |
| 2012/0089952 | A1* | 4/2012 | Song | G06F 1/1684 715/863 |
| 2012/0209796 | A1 | 8/2012 | Vashist et al. | |
| 2014/0026088 | A1 | 1/2014 | Monte | |
| 2014/0032453 | A1 | 1/2014 | Eustice et al. | |
| 2014/0067455 | A1 | 3/2014 | Zhang et al. | |
| 2014/0139637 | A1 | 5/2014 | Misty et al. | |
| 2014/0276244 | A1* | 9/2014 | Kamyar | A61B 5/1112 600/595 |
| 2014/0337791 | A1* | 11/2014 | Agnetta | G06F 3/0481 715/784 |
| 2014/0347289 | A1* | 11/2014 | Suh | G06F 3/017 345/173 |
| 2015/0046828 | A1* | 2/2015 | Desai | G06F 1/163 715/739 |
| 2015/0046884 | A1* | 2/2015 | Moore | G06F 3/0481 715/863 |
| 2015/0085621 | A1* | 3/2015 | Hong | G04G 21/00 368/10 |
| 2015/0370597 | A1* | 12/2015 | Faaborg | G06F 9/46 718/102 |
| 2016/0034133 | A1* | 2/2016 | Wilson | G06F 3/0488 715/772 |
| 2016/0034167 | A1* | 2/2016 | Wilson | G06F 3/04845 715/771 |
| 2016/0054892 | A1* | 2/2016 | Kim | G06Q 10/10 715/808 |
| 2016/0098137 | A1* | 4/2016 | Kim | G06F 1/1643 345/173 |
| 2016/0253050 | A1* | 9/2016 | Mishra | G06F 3/0482 715/727 |
| 2016/0259535 | A1* | 9/2016 | Fleizach | G09B 21/006 |
| 2016/0357420 | A1* | 12/2016 | Wilson | G06F 3/04847 |

OTHER PUBLICATIONS

Russell, Brandon, "Google's Smartwatch Future is Called Android Wear", Published on: Mar. 18, 2014, 9 Pages. Available at: http://www.technobuffalo.com/2014/03/18/google-android-wear-announced/.

Elgan, Mike, "Why Apple Bought Cue (Hint: To Build You a Better iWatch)", Published on: Oct. 5, 2013, 8 Pages. Available at: http://www.cultofmac.com/248525/why-apple-bought-cue-hint-to-build-you-a-better-iwatch/.

Tofel, Kevin C., "Why I want Google Now on my Wrist: Context is King", Published on: Aug. 23, 2013, 7 Pages. Available at: https://gigaom.com/2013/08/23/why-i-want-google-now-on-my-wrist-context-is-king/.

Brown, et al., "Context-awareness: Some Compelling Applications", In Proceedings of the CHI2000 Workshop on the What, Who, Where, When, Why and How of Context-Awareness, Apr. 2000, 9 Pages.

Lamming, et al., ""Forget-me-not" Intimate Computing in Support of Human Memory", In Proceedings of the International Symposium on Next Generation Human Interface, FRIEND21, Feb. 1994, 9 Pages.

Rhodes, Bradley J., "The Wearable Remembrance Agent: A System for Augmented Memory", Published on: Feb. 18, 1998, 10 Pages. Available at: http://alumni.media.mitedu/—rhodes/Papers/wear-ra-personaltech/index.html.

"Pebble Time Awesome Smartwatch, No Compromises", Retrieved on: Apr. 23, 2015, 10 Pages. Available at: https://www.kickstarter.com/projects/597507018/pebble-time-awesome-smartwatch-no-compromises.

"Pebble Smartwatch | Smartwatch for iPhone & Android", Retrieved on: Apr. 23, 2015, 8 Pages. Available at: https://getpebble.com/pebble_?utm_source=kickstarter&utm_medium=web&utm_campaign=ks2&utm_content=herolink.

"International Search Report and Written Opinion Issued in PCT Application No. PCT/US2016/036111", dated Sep. 21, 2016, 12 Pages.

"Second Written Opinion Issued in PCT Application No. PCT/US2016/036111", dated May 3, 2015, 7 Pages.

"International Preliminary Report on Patentability Issued in PCT Application No. PCT/US2016/036111", dated Sep. 19, 2017, 8 Pages.

* cited by examiner

US 9,939,923 B2

1

SELECTING EVENTS BASED ON USER INPUT AND CURRENT CONTEXT

BACKGROUND

Various applications provide information about temporally dependent events such as calendaring applications and to-do-list applications. Such applications provide reminders for scheduled events or tasks, even when they become overdue. However these applications do not furnish information about various events based on a current context. Some existing systems enable setting up some view dates or a period for which a user wants the events to be displayed. However, often a user may need to know a past, current or future event or task based on their current context, and the relevant events or tasks may be different based on different current contexts of the user. In at least these ways, the existing systems fail to provide context-based retrieval of events and tasks and enabling action on them in a natural way.

SUMMARY

Examples of the disclosure determine the current context of a user. User input, in the form of rotational input on a wearable device in some examples, is received to select one or more of context-dependent events from a plurality of past, current, and future events. In some examples, one or more events from the plurality of past, current, and future events and a part of the current context are captured by sensors available on the wearable device. In response to receiving the user input, one or more of the plurality of events are selected based on the determined current context and a direction of the rotational input. A representation of at least one of the selected events is provided on the wearable device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

2

Figure 10:
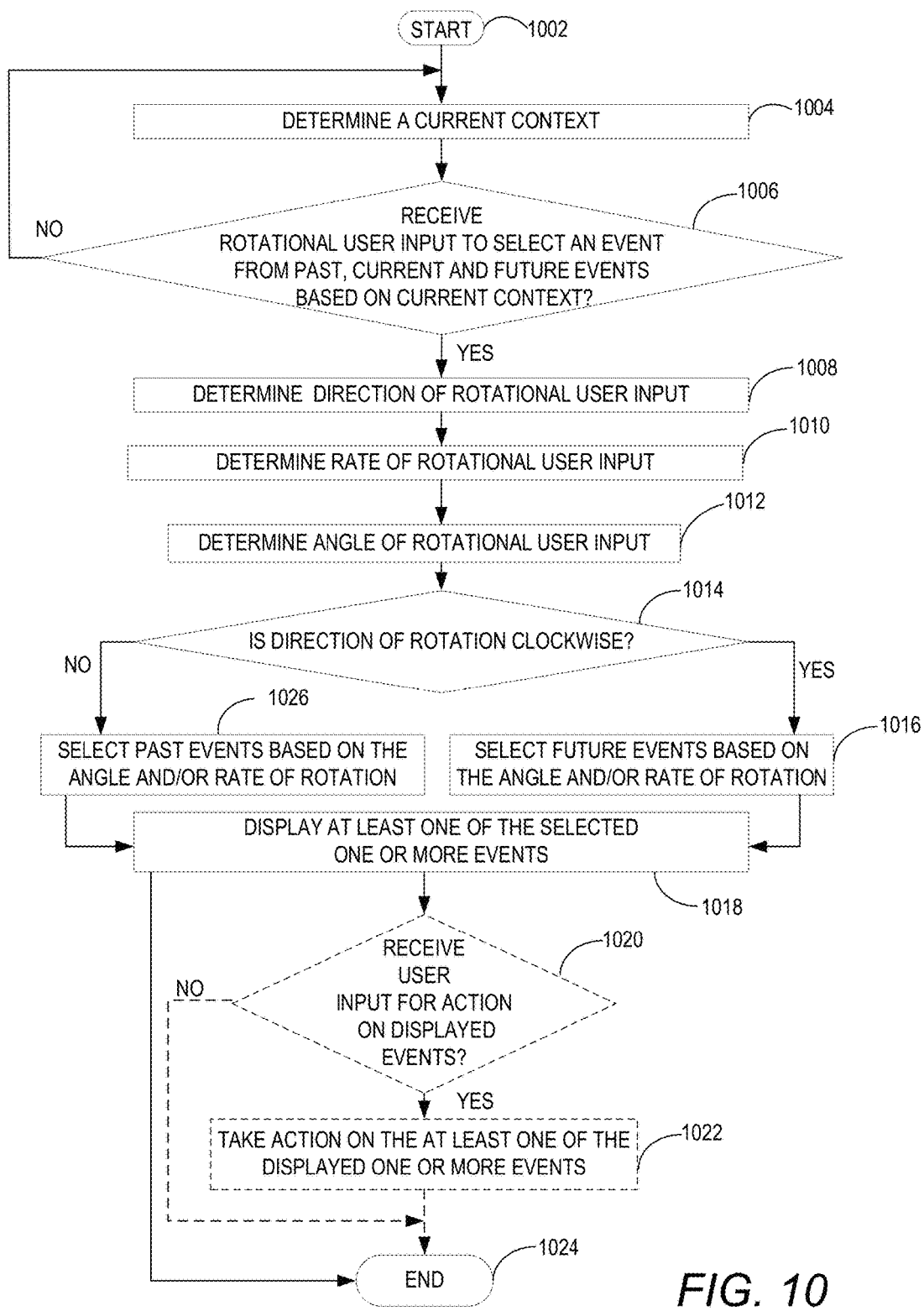

FIG. 10 is an exemplary flowchart illustrating another method for obtaining, displaying, and taking action on a selected event.

Figure 11A:
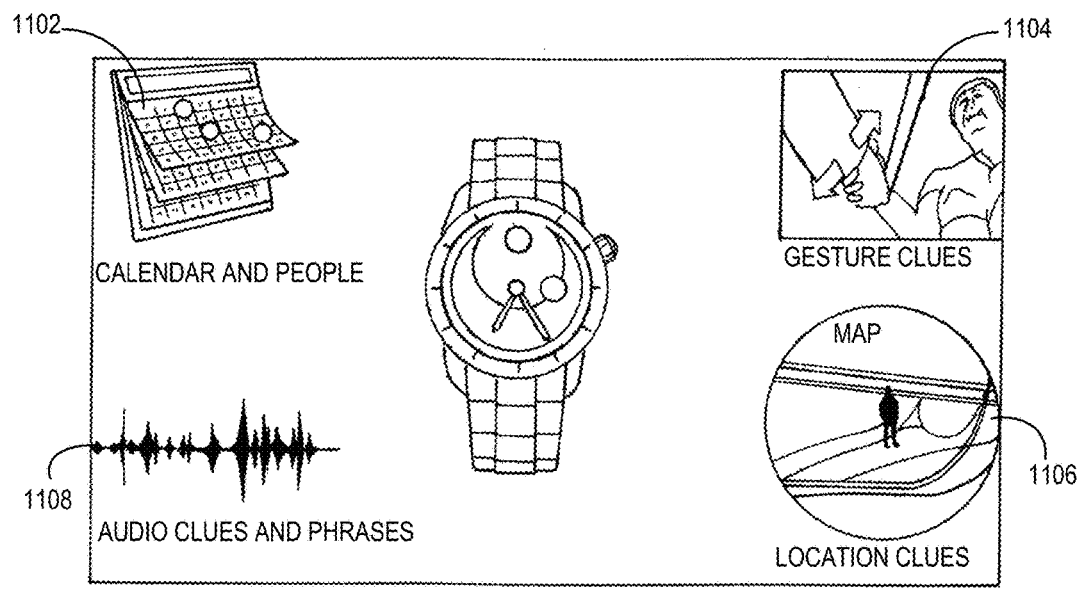

FIG. 11A is an exemplary schematic diagram illustrating how various events may be captured.

Figure 11B:
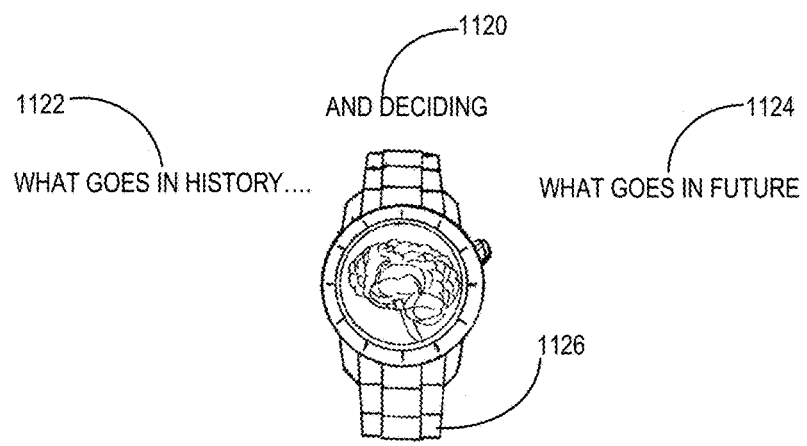

FIG. 11B is an exemplary schematic diagram illustrating an example method of deciding where to store events.

Figure 12A:
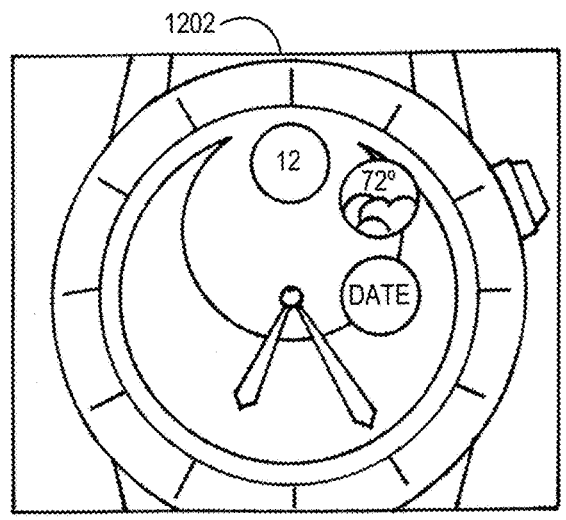
Figure 12B:
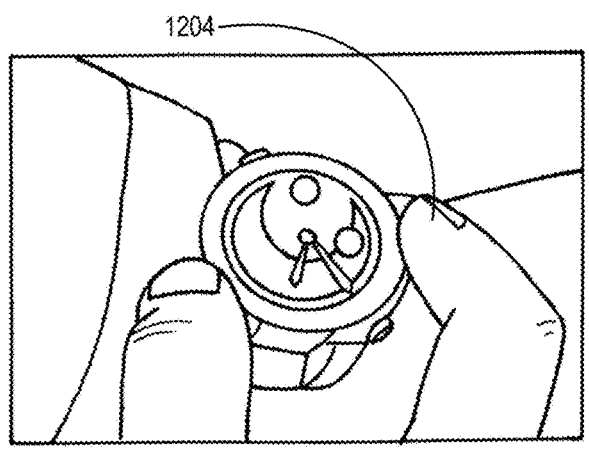
Figure 12C:
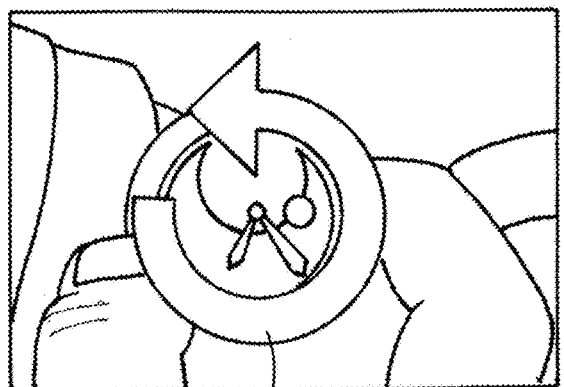

FIG. 12A-12C are exemplary schematic diagrams illustrating an example method of retrieving a past event.

Figure 13:
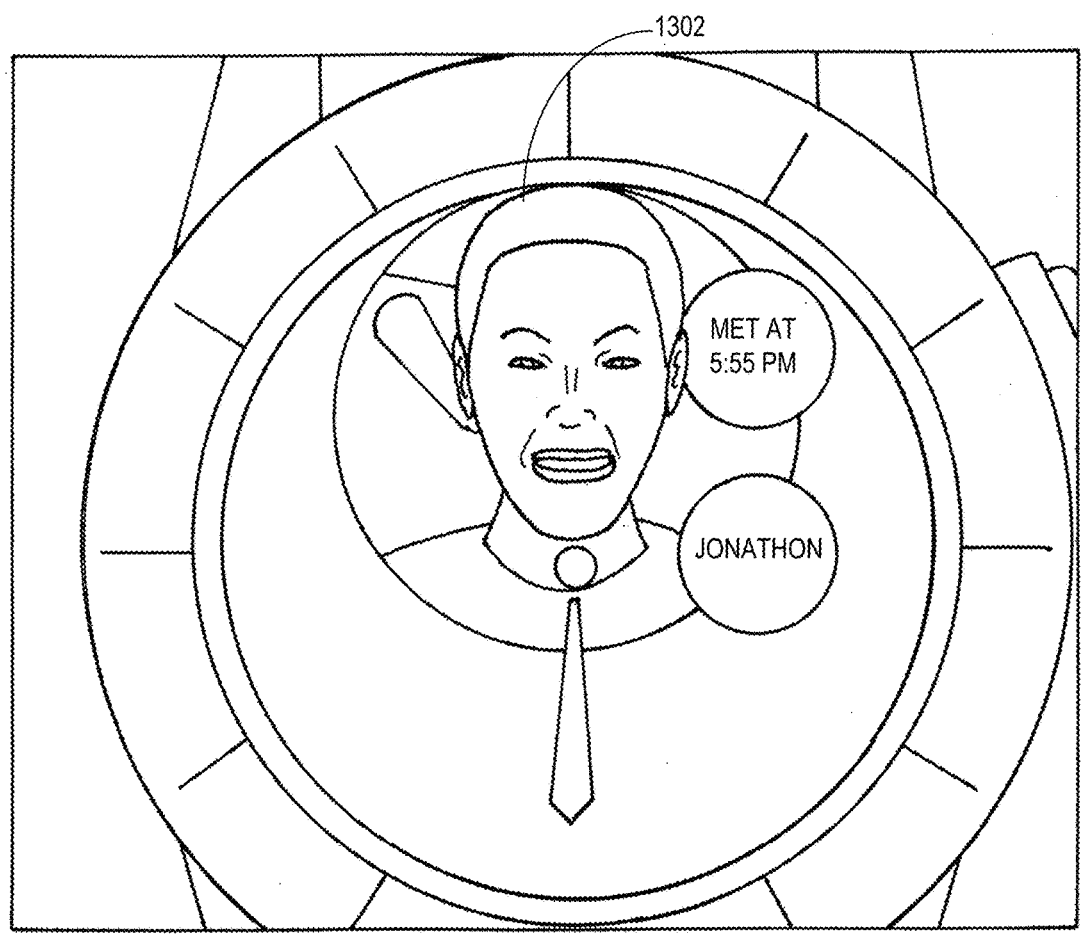

FIG. 13 is an exemplary schematic diagram illustrating an example of a retrieved past event based on a current context.

Figure 14:
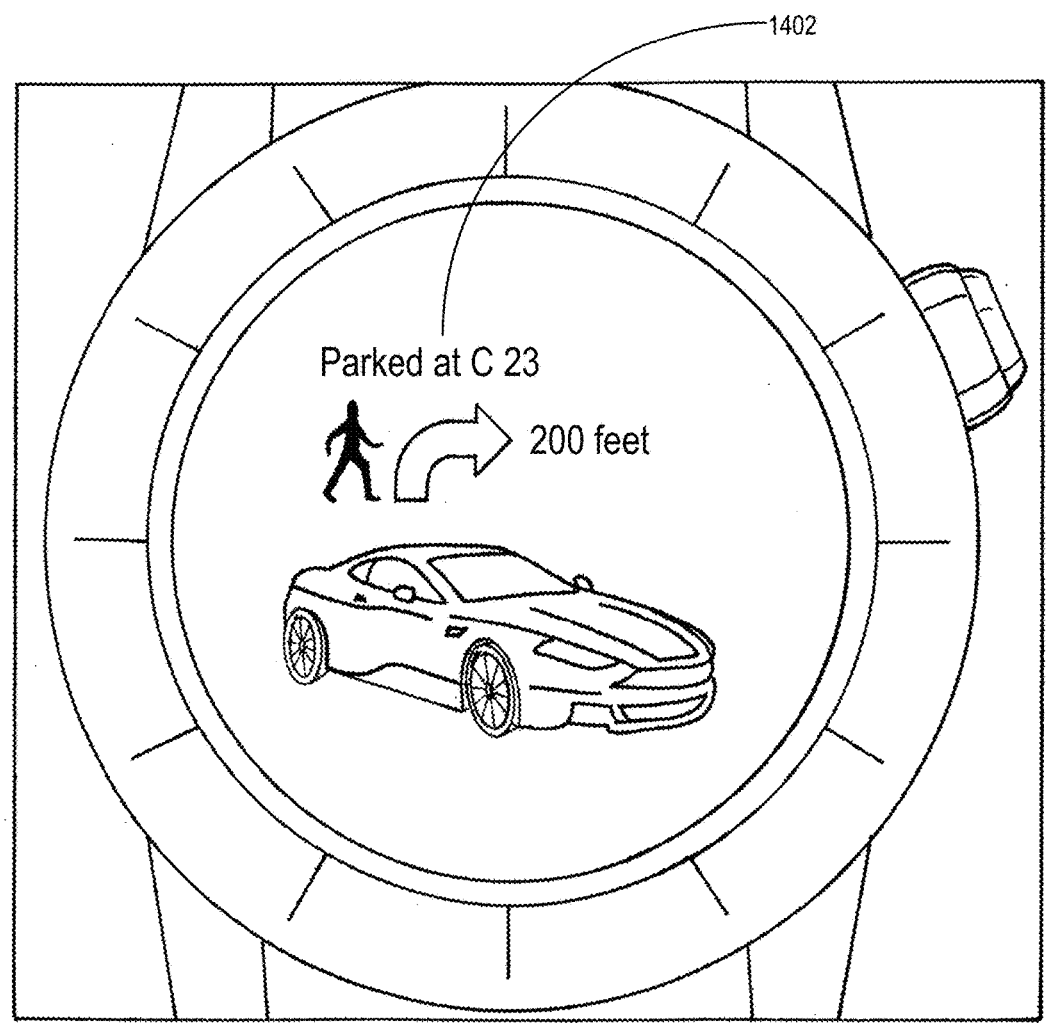

FIG. 14 is an exemplary schematic diagram illustrating an example of a different retrieved past event based on a different current context.

Corresponding reference characters indicate corresponding parts throughout the drawings.

DETAILED DESCRIPTION

Referring to the figures, examples of the disclosure enable retrieving data relating to past, current and future events based on the current context of the user. In some examples, a mobile computing device associated with a user captures current events using sensors and/or applications available on the mobile computing device as shown, for example, in FIG. 11A. Further, the mobile computing device also captures the current context of the user in some examples. The captured events are stored in memory areas (e.g., designated) for past events, currents events, and future events based on the relevance of the captured events to past, current or future time as shown, for example, in FIG. 11B. Data relating to events is retrieved based on user input and the current context of the user, which may be different under different contexts as shown, for example, in FIGS. 13 and 14.

Aspects of the disclosure enable providing data to a user relating to past, current, or future events that are relevant to the current context of the user rather than providing data that may not have any relevance to the current context. Data retrieved based on the current context enables a user to take action on a retrieved event that is most suitable to the current context of the user and avoids providing data that may be outdated or too far in the future so as to be of little use in the present context. Thus, aspects of the disclosure are applicable to all situations in which a present context is established and user inputs for obtaining past or future events that are relevant to the current context are received, interpreted, displayed and/or acted upon.

The term "events" as described herein encompasses "tasks." As such, while the described operations and functionality refer to events, those same operations and functionality are applicable to tasks in the alternative or in addition.

In addition to the events stored by applications such as calendar applications and to-do-lists, other events are captured by the sensors based on the context of the user. An event generation engine component (see FIG. 7, event generation engine component 741) generates events based on the context of the user and these events are stored as past, current, and future events as discussed herein.

Further, aspects of the disclosure provide a natural, intuitive and in some examples, a physical user interface that may be manipulated in a convenient, simple, and intuitive way without opening any calendar-based or to-do list based application and scan through myriad events or tasks to find a relevant event or task. Further, aspects of the disclosure provide increased user interaction performance and reduced error rates because the most relevant event is retrieved and presented to the user based on the current context of the user. Additionally, in examples where a wearable device, for example a smart watch, is used as a mobile computing device, aspects of the disclosure lead to miniaturization and convenience of a device that is handy to observe and manipulate without any need to take the device out from a pocket of the user.

Figure 1:
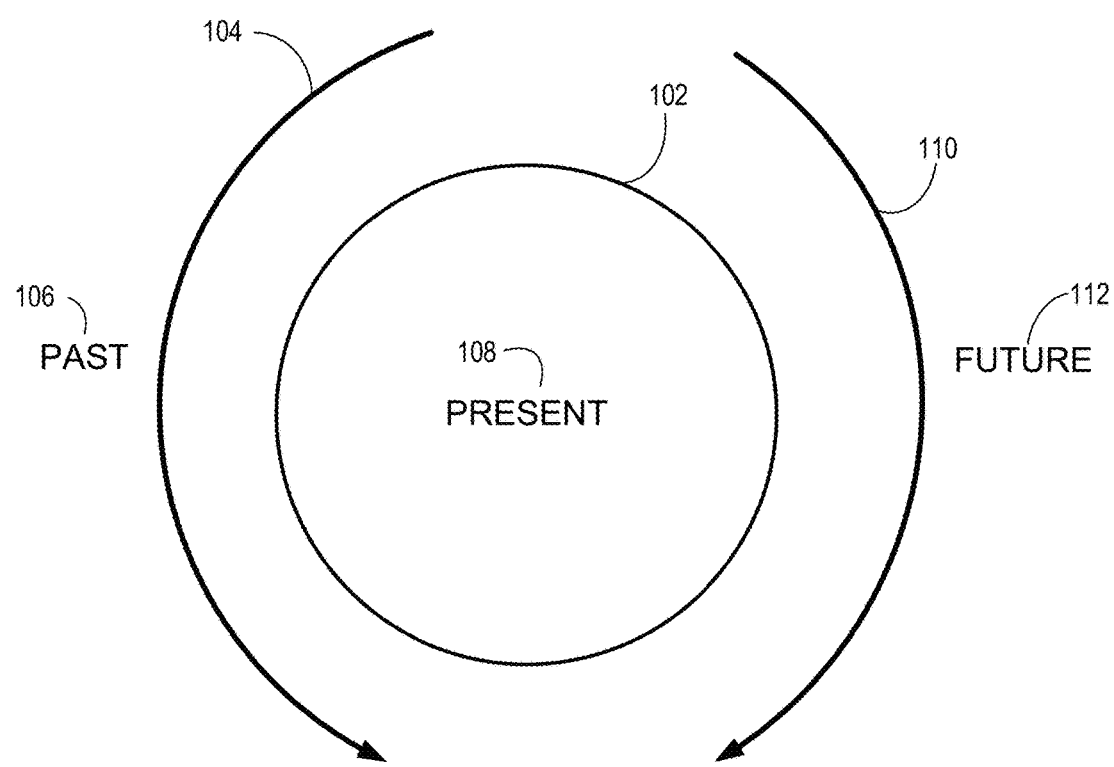
FIG. 1 is an exemplary schematic diagram illustrating the concept of past, current, and future events in the present context.

Referring now to FIG. 1, an exemplary schematic diagram illustrates the concept of past, present, and future events in relation to a present context. These events include known past, present, and future events and also the events generated by the event generation engine component 741 (e.g., in real time). The current context of a user is conceptually shown by a circle 102 that represents the current context as PRESENT 108. Past time is conceptually shown to the left of the "PRESENT 108" and represented as PAST 106. Future time is conceptually shown to the right of the "PRESENT 108" and represented as FUTURE 112. To obtain data for a past event in relation to the present context, the user, in an example, provides an anticlockwise rotational input as schematically shown by a curved anticlockwise arrow 104. Exemplary rotational inputs may be rotation of a ring, a dial, a crown, some other part of a wearable device, and/or a smart watch worn by the user may itself be rotated relative to the wrist of the user. Other forms of rotational inputs such as rotational gesture input and rotational touch input, tilt inputs, shake inputs, linear inputs or the like are within the scope of the disclosure. To obtain data for a future event in relation to the present context, the user, in an example, provides a clockwise rotational input as schematically shown by a curved clockwise arrow 110.

Figure 2:
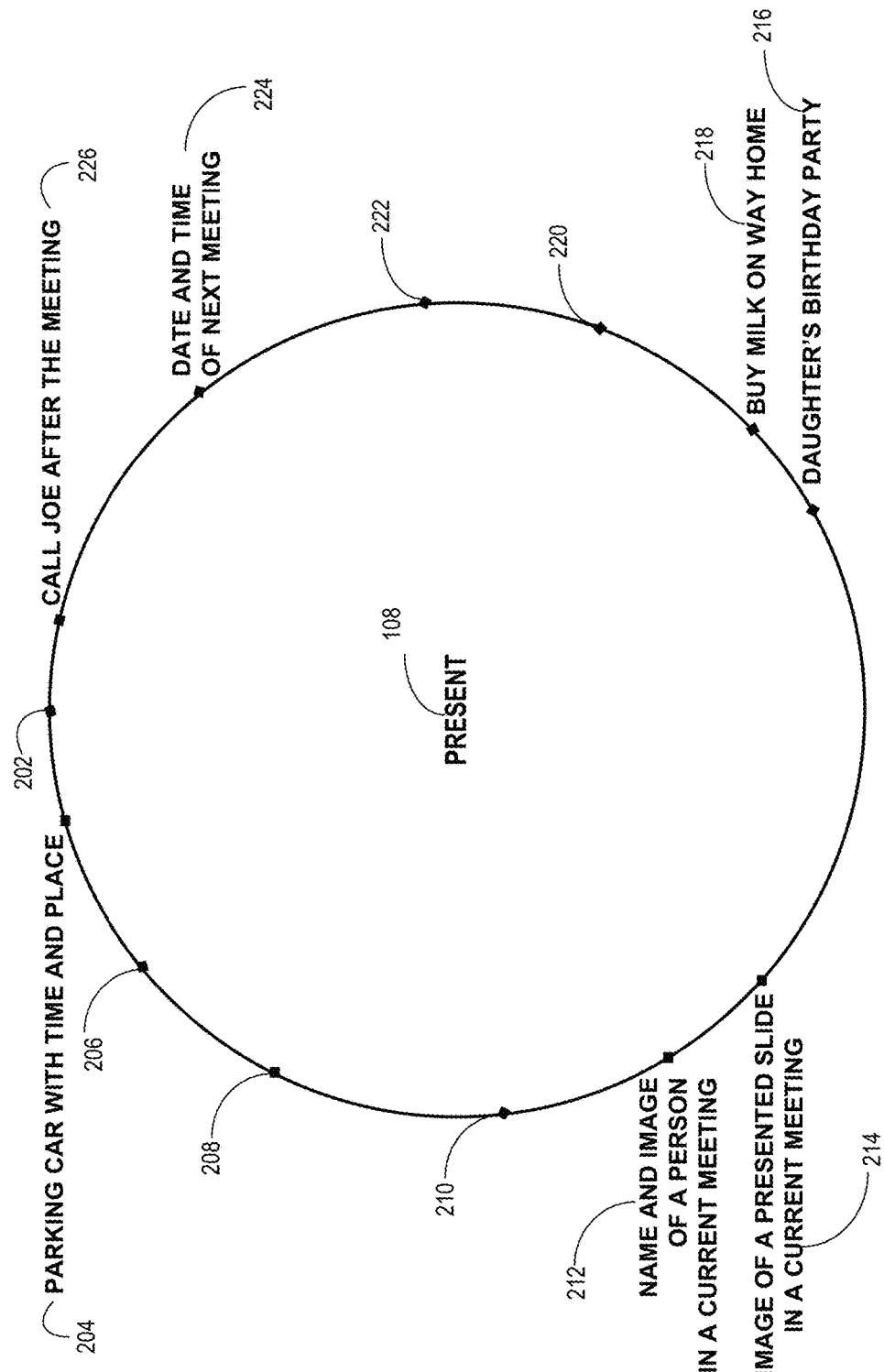
FIG. 2 is an exemplary schematic diagram illustrating some exemplary past and future events.

Referring to FIG. 2, an exemplary schematic diagram illustrates some exemplary past and future stored events. The events are represented by 202, 204, 206, 208, 210, 212, 214, 216, 218, 220, 222, 224, and 226. For example, an example past event may be PARKING CAR WITH TIME AND PLACE 204, that was auto-generated by the event generation engine component 741. Another example past event may be NAME AND IMAGE OF A PERSON IN A CURRENT MEETING 212 that was recorded a short while ago during introduction of the participants in a current meeting. One more example past event may be IMAGE OF A PRESENTED SLIDE IN A CURRENT MEETING 214 that was presented a little while ago in the current meeting. Some exemplary events are derived based on the current context of the user, the current context being sensed by the sensors (e.g., guessing where the user is and whose names to replay). If the user, while participating in a current meeting, forgets the name and face of a participant, the user may retrieve it as a context-dependent past event, an example of which is shown in FIG. 13. Similarly, while still participating in the current meeting, the user may wish to see a previously presented slide and the image of the slide is shown to the user as another context-dependent event as shown at 214 in FIG. 2. However, if the user tries to retrieve a context-dependent past event while the user has walked to the parking lot at the end of a working day in office, the depicted event is PARKING CAR WITH TIME AND PLACE 204, such as shown, for example in FIG. 14. Further, an action such as the car emitting a beep to indicate its location, may be taken based on the user activating this depicted task via wireless communication between the device of the user and the car.

Similarly, an example future event may be DAUGHTER'S BIRTHDAY PARTY 216. Another example of a future event may be BUY MILK ON WAY HOME 218. One more example of a future event may be DATE AND TIME OF NEXT MEETING 224. Further, another example of a future event may be CALL JOE AFTER THE MEETING 226. For example, if the user tries to retrieve a future event immediately after the current meeting the first event depicted may be CALL JOE AFTER THE MEETING 226. In one example, the user may provide further input to activate the task CALL JOE AFTER THE MEETING 226, and action is taken to call Joe. In another example, the task may not be depicted but action is automatically taken to call Joe. In one other example, the task CALL JOE AFTER THE MEETING 226 is depicted and action is automatically taken to call Joe in the absence of any further input by the user. If the user continues to seek another related future event, DATE AND TIME OF NEXT MEETING 224 is shown. Thus, a most relevant event for a given context is shown.

Continuing with other examples, an event DAUGHTER's BIRTHDAY PARTY 216 and another event BUY MILK ON WAY HOME 218 may be stored as future events. The event "DAUGHTER's BIRTHDAY PARTY 216" may be relatively more distant one than the event "BUY MILK ON WAY HOME 218." Accordingly, if the user gives a command to show a relevant future event after the user has spotted their car as discussed herein, the event that is depicted is "BUY MILK ON WAY HOME 218." Activating this task may present a map in the car of the user, with the map showing the nearest milk vending shop and its route from a current location of the user.

Figure 3:
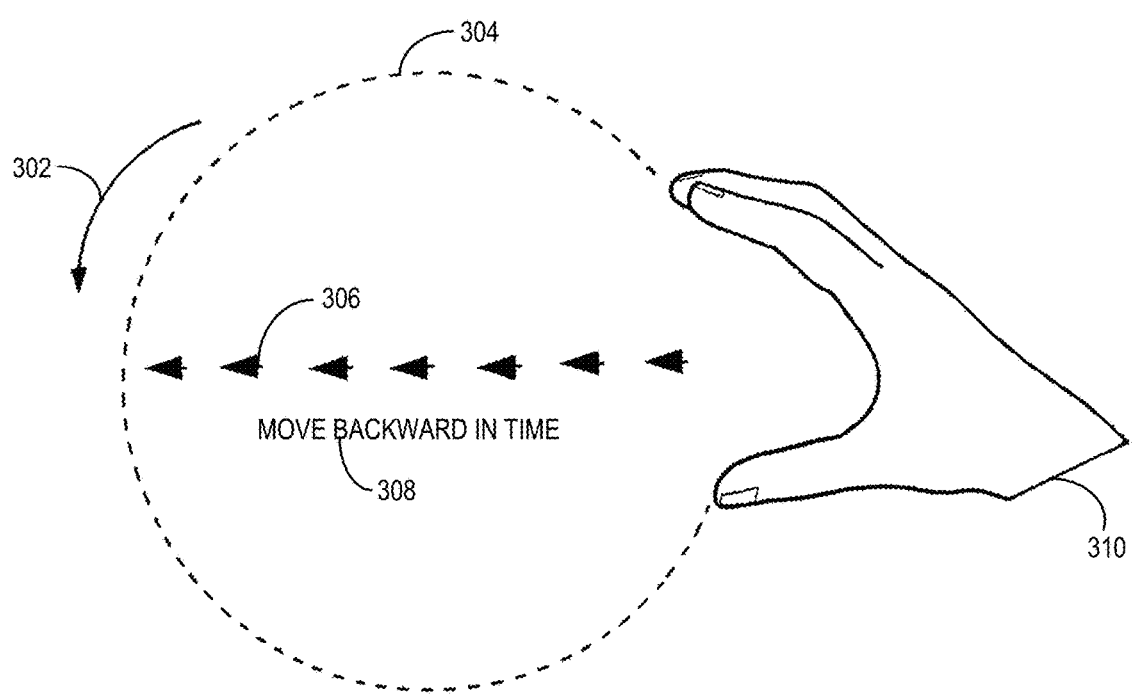
FIG. 3 is an exemplary schematic diagram illustrating a method of obtaining data relating to a past event.

Referring to FIG. 3, an exemplary schematic diagram illustrates a method for obtaining data relating to a past event. A ring or a dial 304 on a mobile computing device, for example a wearable smart watch, is rotated in an anticlockwise direction 302 to obtain one or more context-dependent past events. A series of small bold arrows 306 symbolically shows the concept of MOVE BACKWARD IN TIME as shown by the text 308. The hand 310 of the user, in one example, may physically move the ring or a dial 304 in an anticlockwise direction, or provide a suitable gesture input or touch input in other examples.

Figure 4:
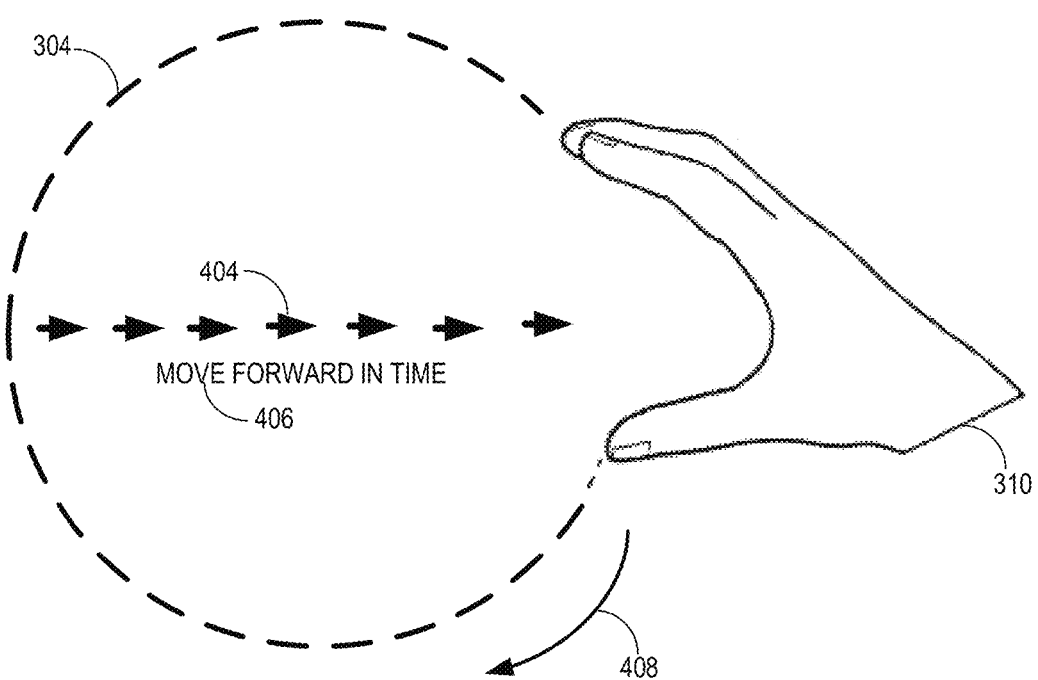
FIG. 4 is an exemplary schematic diagram illustrating a method of obtaining data relating to a future event.

Referring to FIG. 4, an exemplary schematic diagram illustrates a method of obtaining data relating to a future event. A ring or a dial 304 on a mobile computing device, for example a wearable smart watch, is rotated in a clockwise direction 408 to obtain one more context-dependent future events. A series of small bold arrows 404 symbolically shows the concept of MOVE FORWARD IN TIME as shown by the text 406. The hand 310 of the user, in one example, may physically move the ring or a dial 304 in a clockwise direction or provide a suitable gesture input or touch input in other examples.

As discussed earlier in connection with FIG. 2, past, current, and future events are stored on the mobile computing device 702 and/or on other entities such as a server or a cloud service 746 associated with the mobile computing device 702. The stored events are the events captured by the sensors 706 and the events that are part of applications 710 such as calendar applications or to-do-list. A sensor on the mobile device 702 senses the direction, magnitude and rate of rotation of the rotational input. Based on the detection of the direction, magnitude and rate of rotation of the rotational input and the current context, relevant past or future events are retrieved and presented to the user as discussed herein.

Figure 5A:
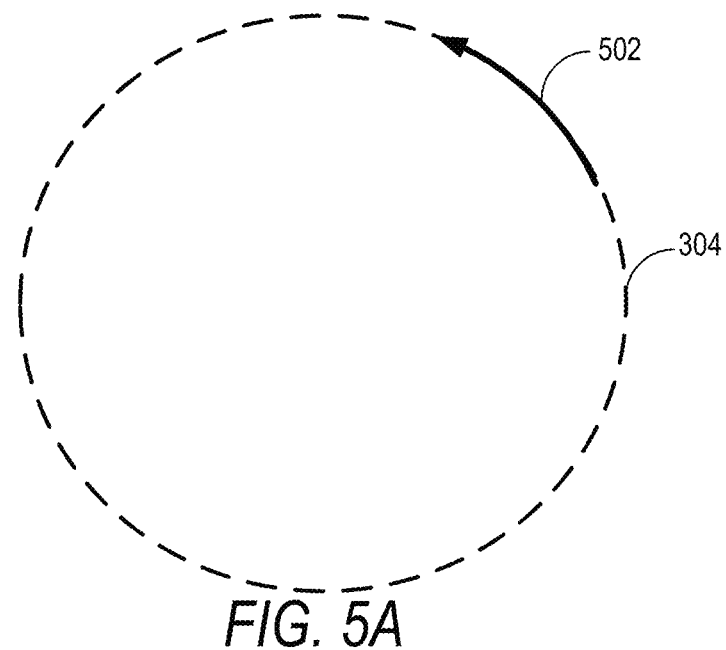
FIGS. 5A-5C are exemplary schematic diagrams illustrating a method of obtaining data relating to a past event based on an input angle.
Figure 5B:
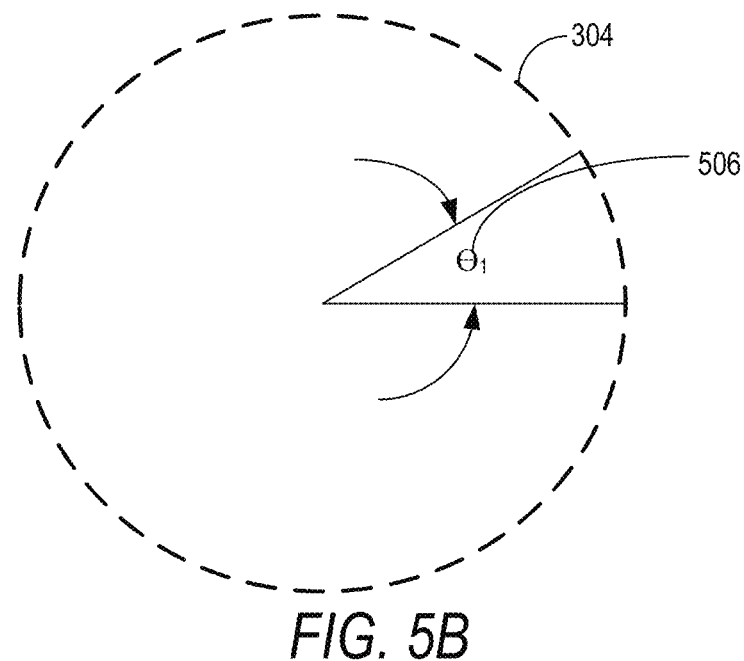
Figure 5C:
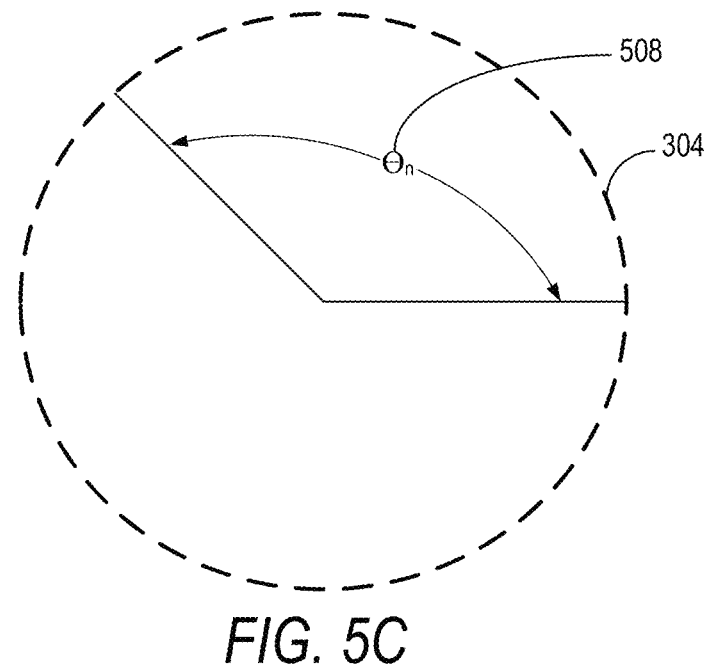

FIGS. 5A-5C are exemplary schematic diagrams illustrating a method of obtaining data relating to one or more context-dependent past events based on an input angle. In one example, the ring or dial 304 is rotated in an anticlockwise direction as shown at 502 in FIG. 5A or in another example, rotational anticlockwise input is given using suitable means such as a natural gesture input and the like. The data relating to one or more past events is a function of the angle traversed by the input from its initial position as shown, for example, at 506 as $\theta_1$ in FIG. 5B. The traversed angle may vary, for instance, from $\theta_1$ to $\theta_n$ shown at 508 in FIG. 5C, where $\theta_n$ may have any value from an initial minimum value to k*π, and where k may have any finite positive numerical value. For each incremental finite value of the angle traversed, a new past event is retrieved based upon the present context. For example, if the minimum input angle value for which a new event is retrieved, is 0.028 radians (approximately 5 degrees), then twice the minimum input angle value (e.g., 0.056 radians) may show a second context-dependent past event, in one example.

In another example, 0.056 radians may show both the first and the second retrieved past events. Thus, each pre-defined increment fetches the corresponding context-defined event or the corresponding context-dependent event in addition to the earlier retrieved events. Any partial increment is ignored until the increments equals or exceeds the pre-defined incremental value.

In some examples, the number and granularity of the retrieved events is a function of the rate of the input. In such examples, the minimum incremental value for obtaining the next context-dependent event itself is a function of the rate of input. For example, a faster rate of input for the same traversed total angle may retrieve a larger number of events closely spaced, while a slower rate of input may retrieve a smaller number of events with larger spacing between them. For example, the faster rate of input may be any value equal to or higher than π/2 radians per second. Thus, the higher the rate of input, the larger are the number of events retrieved for the same total input so long as the input rate is equal to or higher than a pre-defined minimum value.

Similarly, for any value less than the pre-defined value, such as π/2 radians per second, the lower the rate of input the smaller are the number of events retrieved for the same total input so long as the input rate is lower than the pre-defined minimum value.

In some examples, if the input rate is low, for example lower than π/2 radians per second, and the total input angle is greater than a pre-defined angle, such as for example π/8 radians and less than another pre-defined angle, such as for example π radians, a continuum of past context-dependent events is retrieved and shown at equally spaced intervals or based on their time stamps. The continuum of past context-dependent events may begin with the event that would be retrieved if the input were the minimum pre-defined input angle and may end with the event that would be retrieved if the input were the maximum pre-defined input angle.

Figure 6A:
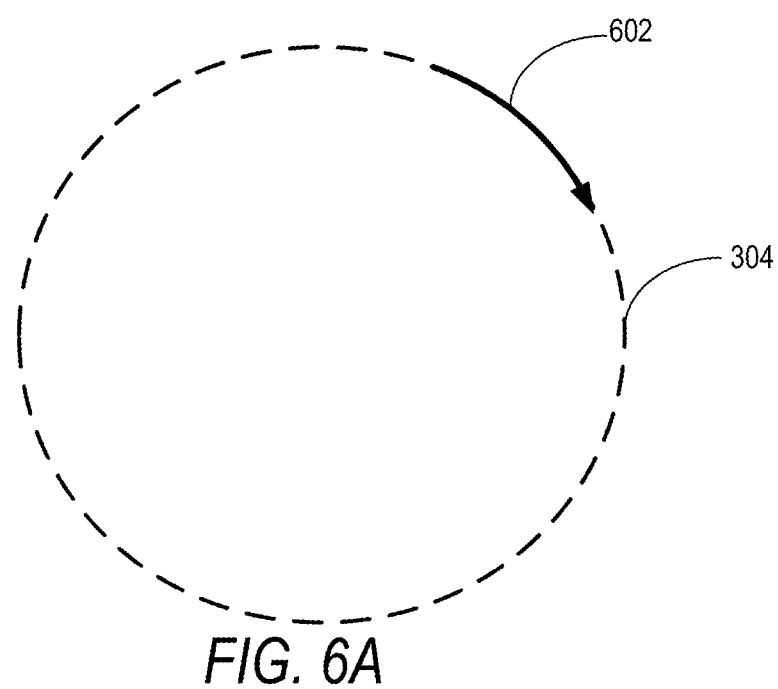
FIGS. 6A-6C are exemplary schematic diagrams illustrating a method of obtaining data relating to a future event based on an input angle.
Figure 6B:
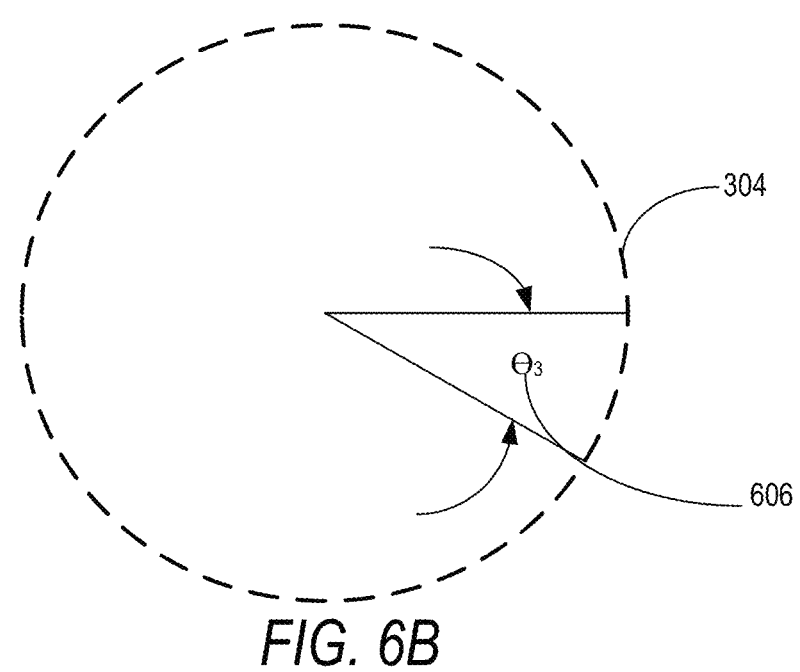
Figure 6C:
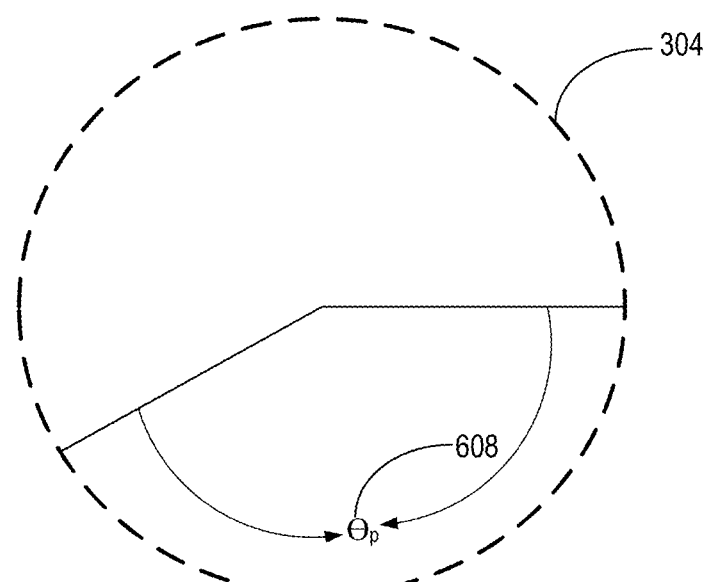

FIGS. 6A-6C are exemplary schematic diagrams illustrating a method for obtaining data relating to one or more context-dependent future events based on input angle. In one example, the ring or dial 304 is rotated in a clockwise direction as shown at 602 in FIG. 6A or in another example, rotational clockwise input is given using suitable means such as gesture input, touch input and the like. The data relating to one or more future events is a function of the angle traversed by the input from its initial position as shown, for example, at 606 as $\theta_3$ in FIG. 6B. The traversed angle may vary, for instance, from $\theta_3$ to $\theta_p$ shown in FIG. 6C at 608, where $\theta_p$ may have any value from an initial minimum value to m*π, and where m may have any finite positive numerical value. For each incremental finite value of the angle traversed, a new future event is retrieved based upon the present context. For example, if the minimum input angle value for which a new event is retrieved, is 0.028 radians (approximately 5 degrees), then twice the minimum input angle value (e.g., 0.056 radians) may show a second context-dependent future event, in one example.

In another example, 0.056 radians may show both the first and the second retrieved future events. Thus, each pre-defined increment fetches the corresponding context-dependent event or the corresponding context-dependent event in addition to the earlier retrieved events. Any partial increment is ignored until the increments equals or exceeds the pre-defined incremental value.

In some examples, the number and granularity of the retrieved events is a function of the rate of the input. In such examples, the minimum incremental value for obtaining the next context-dependent event itself is a function of the rate of input. For example, a faster rate of input for the same traversed total angle may retrieve a larger number of events closely spaced, while a slower rate of input may retrieve a smaller number of events with larger spacing between them. For example, the faster rate of input may be any value equal to or higher than π/2 radians per second. Thus, the higher the rate of input, the larger are the number of events retrieved for the same total input so long as the input rate is equal to or higher than a pre-defined minimum value.

Similarly, for any value of the rate of input less than the pre-defined value, such as such as π/2 radians per second, the lower the rate of input, the smaller are the number of events retrieved for the same total input so long as the input rate is lower than the pre-defined minimum value.

In some examples, if the input rate is low, such as lower than π/2 radians per second, and the total input angle is greater than a pre-defined angle, such as π/8 radians and less than another pre-defined angle, such as π radians, a continuum of future context-dependent events is retrieved and shown at equally spaced intervals or based on their time stamps. The continuum of future context-dependent events may begin with the event that would be retrieved if the input were the minimum pre-defined input angle and may end with the event that would be retrieved if the input were the maximum pre-defined input angle.

Figure 7:
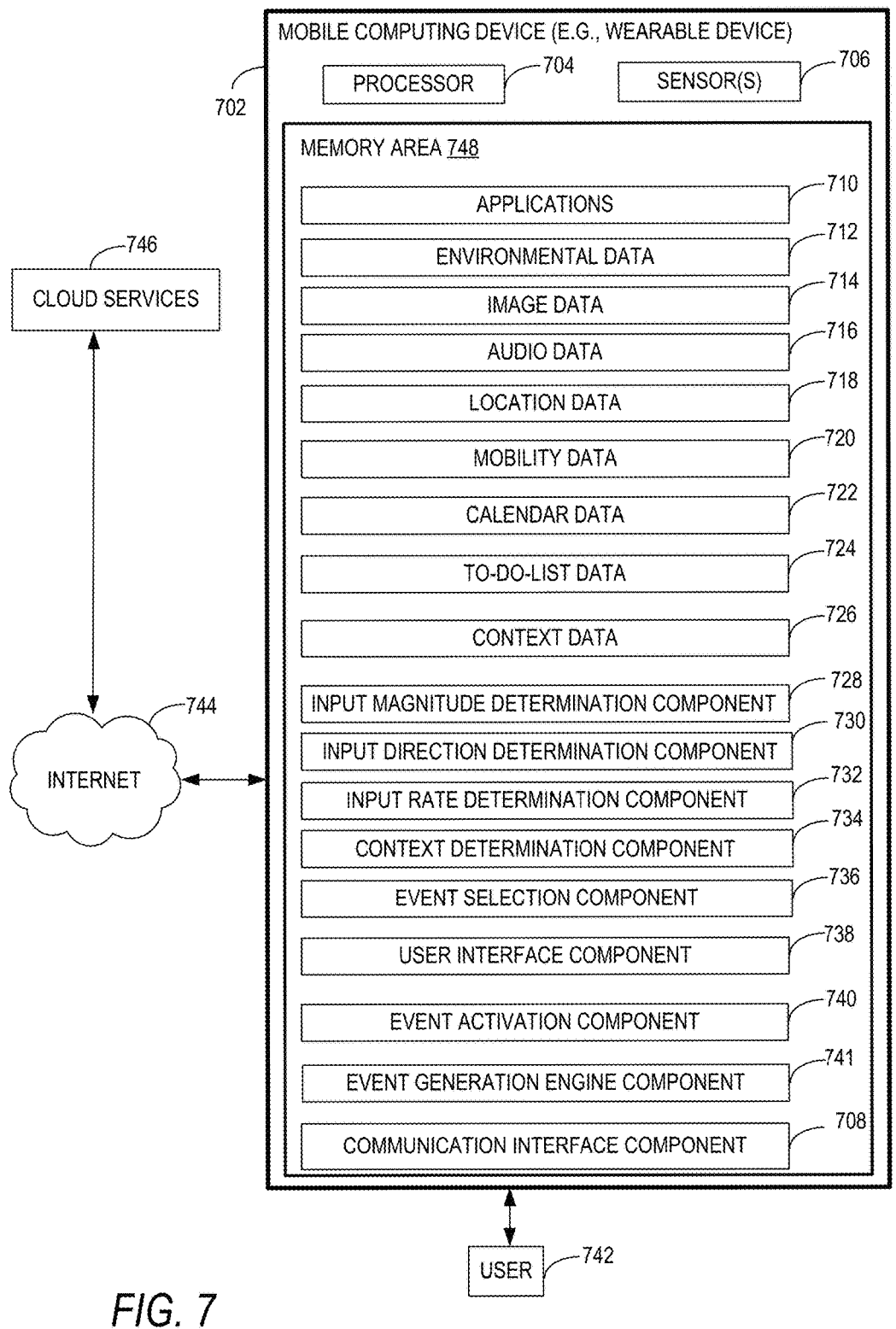
FIG. 7 is an exemplary block diagram illustrating a mobile computing device as used in some examples of the current disclosure.

Referring now to FIG. 7, an exemplary block diagram illustrates a mobile computing device 702 as used in some examples. In the example of FIG. 7, the mobile computing device 702 associated with a user 742 represents a system for displaying and taking action on context-dependent past, current or future events. The mobile computing device 702 (e.g., a wearable device) represents any device executing instructions (e.g., as application programs, operating system functionality, or both) to implement the operations and functionality associated with the mobile computing device. The mobile computing device 702 may include any other portable device. In some examples, the mobile computing device 702 includes a mobile telephone, laptop, tablet, computing pad, netbook, gaming device, and/or portable media player. The mobile computing device 702 may also include less portable devices such as desktop personal computers, kiosks, tabletop devices, industrial control devices, wireless charging stations, and electric automobile charging stations. Additionally, the mobile computing device 702 may represent a group of processing units or other computing devices.

In some examples, the mobile computing device 702 has at least one processor 704, a memory area 748, and at least one user interface component 738. The processor 704 includes any quantity of processing units, and is programmed to execute computer-executable instructions for implementing aspects of the disclosure. The instructions may be performed by the processor 704 or by multiple processors executing within the computing device, or performed by a processor external to the computing device. In some examples, the processor 704 is programmed to execute instructions such as those illustrated in the figures (e.g., FIGS. 8, 9, and 10).

In some examples, the processor 704 represents an implementation of analog techniques to perform the operations described herein. For example, the operations may be performed by an analog computing device and/or a digital computing device.

The mobile computing device further has one or more computer readable media such as the memory area 748. The memory area 748 includes any quantity of media associated with or accessible by the mobile computing device 702. The memory area 748 may be internal to the mobile computing device 702 (as shown in FIG. 7), external to the mobile computing device 702 (not shown), or both (not shown). In some examples, the memory area 748 includes read-only memory and/or memory wired into an analog computing device.

The memory area 748 stores, among other data, one or more applications 710. The applications 710, when executed by the processor 704, operate to perform functionality on the mobile computing device 702. Exemplary applications include mail application programs, web browsers, calendar application programs, to-do-list applications, speech-recognition applications, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area 748 further stores environmental data 712, image data 714, audio data 716, location data 718, mobility data 720, calendar data 722, to-do-list data 724, and context data 726. The stored data forms a part of a plurality of past, current, and future event data. The memory area 748 further stores one or more computer-executable components. While the one or more computer-executable components and various data are shown as being logically stored in the memory area 748, some of this data and components may be physically stored elsewhere on the mobile computing device 702 or other entities associated with the mobile computing device 702 such as cloud services 746.

Exemplary components include an input magnitude determination component 728, an input direction determination component 730, an input rate determination component 732, a context determination component 734, an event selection component 736, a user interface component 738, an event activation component 740, and an event generation engine component 741. The event generation engine component 741, when executed by the processor 704 associated with the mobile computing device 702 causes the processor 704 to generate events based on the context of the user. For example the events may be auto-generated by the event generation engine component 741. The input magnitude determination component 728, when executed by the processor 704 causes the processor 704 to determine the magnitude of an input given by a user 742. The input direction determination component 730, when executed by the processor 704 causes the processor 704 to determine the direction of the input. The input rate determination component 732, when executed by the processor 704 causes the processor 704 to determine the rate of the input. The context determination component 734, when executed by the processor 704 causes the processor 704 to determine the current context of the user in which the user input was given. The event selection component, when executed by the processor 704 causes the processor 704 to selects one or more events from a plurality of past, current, and future events based on the determined direction and magnitude of the rotational user input and the determined current context, the past, current, and future events including events generated by the event generation engine component 741. The plurality of past, current, and future events is accessed by the communication interface component 708, as discussed below. Once the one or more events from a plurality of past, current, and future events have been selected, the user interface component displays the selected events in a user interface on the mobile computing device 702. In some examples, displaying the selected events includes displaying data associated with the selected events.

In some examples, the event activation component 740, when executed by the processor 704, causes the processor to perform at least one suitable action as indicated by the selected events in consonance with the current context. In one example, the event activation component 740 may cause the processor to perform the suitable action as indicated by the selected events without the selected events being displayed. In another example, the event activation component 740 may cause the processor to perform the suitable action as indicated by the selected events after the selected events have been displayed. In some examples, the event activation component 740 may cause the processor to perform the suitable action as indicated by the displayed events after the user interface component 738 has received a command from the user for taking the suitable action based on the displayed events and their associated data. In some other examples, the user interface component 738 may display one or more proposed actions corresponding to the selected the events and the current context, and the event activation component 740 may cause the processor to perform the proposed actions(s) automatically, when a pre-defined time has elapsed after displaying the proposed actions and no further user input has been received.

The mobile computing device includes a communication interface component 708. In some examples, the communications interface component includes a network interface card and/or computer-executable instructions (e.g., a driver) for operating the network interface card. Communication between the mobile computing device and other devices (e.g. a cloud service or other servers) may occur using any protocol or mechanism over any wired or wireless connection including, for example a cellular network or a broadband network. In some examples, the communications interface is operable with short range communication technologies such as by using near-field communication (NFC) tags. The communication interface component 708, when executed by the processor 704 causes the processor 704 to access a plurality of past, current, and future events stored in the memory area 746 and/or stored in the cloud services 746, the mobile computing device 702 being in communication with the cloud services 746 via the Internet 744.

The mobile computing device includes a user interface component 738. In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component 738 may use one or more of the following to provide data to the user or receive data from the user: speakers, a sound card, a vibration motor, touch sensing hardware, gesture-sensing hardware, a BLUETOOTH brand communication module, global positioning system (GPS) hardware, and one or more sensors 706 that are also used for capturing events and contexts. The sensors may include accelerometers, gyroscopes, GPS receiver, proximity sensor, photoreceptive light sensor, 3D infrared camera that includes a depth sensor, a two-dimensional RGB camera, and a multi-array microphone. For example, the user may input commands or manipulate data by moving the mobile computing device 702 in a particular way including tilting, shaking and rotating the mobile computing device 702.

In some examples, the one or more sensors and other components of the mobile computing device 702 may comprise microelectromechanical systems (MEMS), thereby leading to further miniaturization of the mobile computing device 702. The mobile computing device 702 may have other sensors providing data describing the state of the mobile computing device 702.

Figure 8:
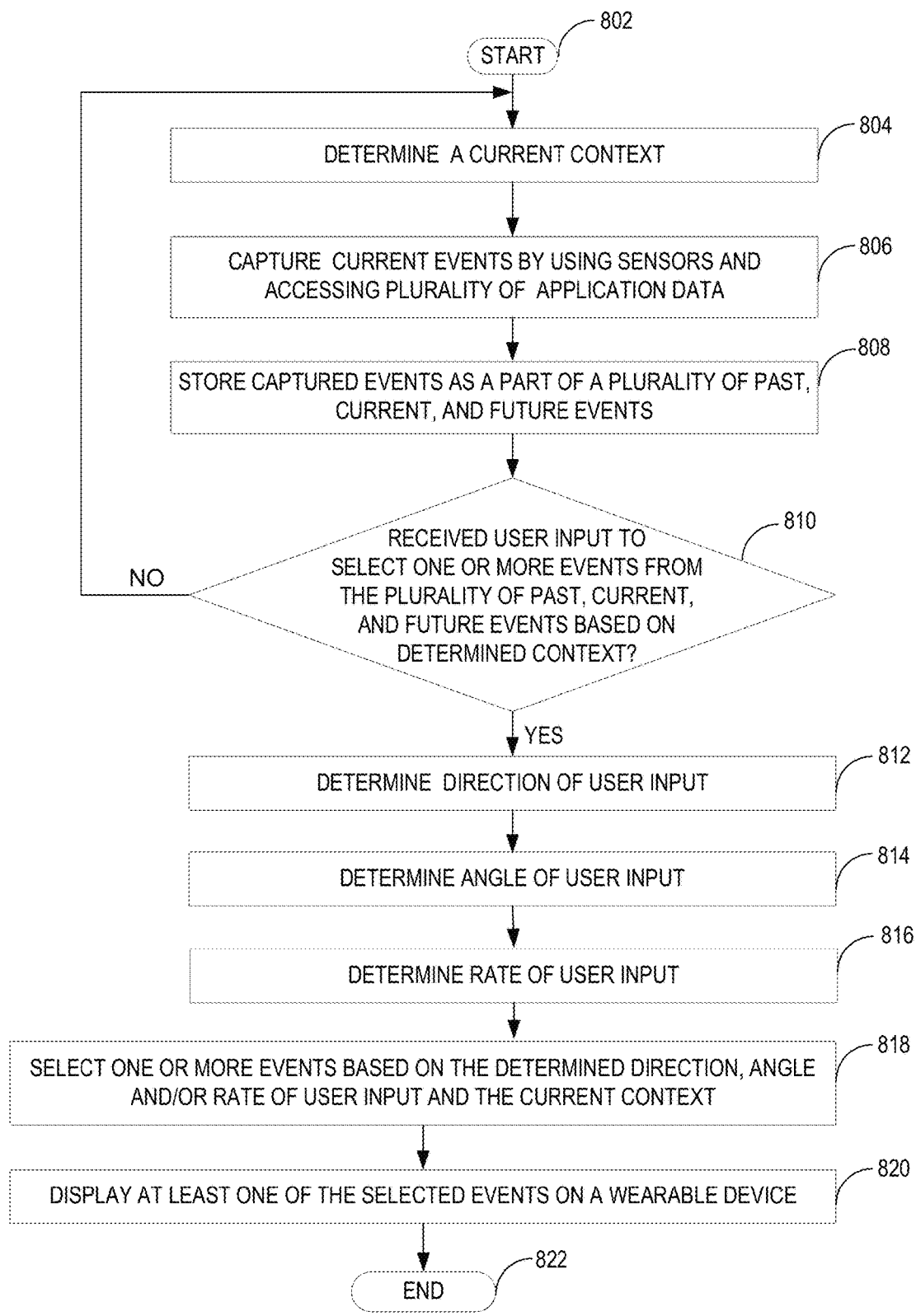
FIG. 8 is an exemplary flowchart illustrating a method for obtaining and displaying a selected event.
Figure 9:
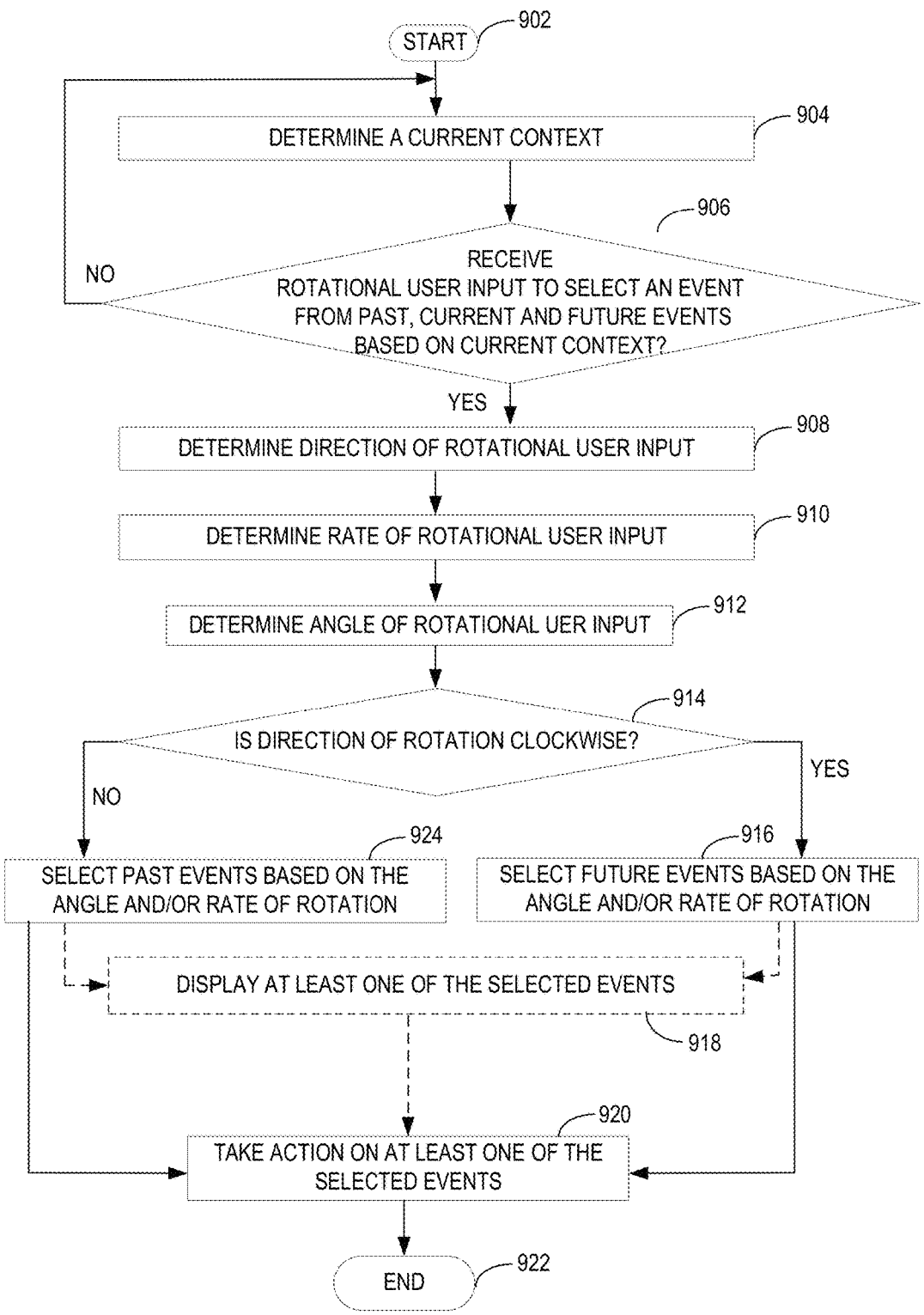
FIG. 9 is an exemplary flowchart illustrating a method for obtaining, displaying and taking action on a selected event.

FIGS. 8, 9 and 10 depict exemplary flowcharts for displaying and/or acting on selected events and/or tasks. While the operations shown in the flowcharts may be executed by the mobile computing device 702, aspects of the disclosure are operable with other entities executing one or more of the operations shown in the flowcharts. For example, one or operations may be executed by a mobile telephone associated with the user. In some other examples, one or operations may be executed by a server remote from the mobile computing device 702 yet in communication with the mobile computing device 702 and/or one or operations may be executed by the cloud services 746.

Referring now to FIG. 8, an exemplary flowchart illustrates a process for selecting and displaying on a device of the user, a few events from a plurality of stored past, current, and future events based on the current context of a user. The process begins at 802. At 804, the current context of the user and/or the device of the user is determined. For example, the present location, environment, time of the day, date, surroundings, ambience, proximity with a set of persons, mode of motion, and a state of the device of the user (e.g., locked screen of a mobile computing device) and the like may be determined by the mobile computing device 702. At 806, current events are captured using sensors 706 and accessing data associated with some of the applications 710, for example calendar data and to-do-list data. At 808, the captured events are stored as a part of a plurality of past, current, and future events that may be already stored. The events are stored along with their associated data as n-tuples forming an n-tuple vector space. For example, events may be stored with their associated time stamps and contexts. If the event is a task, the event may be stored along with a scheduled time and date, and any data and/or object to be used in performing or activating the tasks.

Whether a user input has been received to select one or more events from the plurality of stored past, current, and future events based on the determined current context is checked at 810. For example, the mobile computing device 702 may iteratively check if the user input has been received as shown by the arrow "NO" that loops back to the determination of the current context in the absence of receipt of any user input. If a user input is received, for example in the form of rotating a ring or a dial, or a rotational gesture input or a rotational touch input, or a tilt input, at 812 the direction of the input is determined. For example, the mobile computing device 702 determines whether the direction of rotational input is clockwise or anticlockwise. In some examples, the user input may be in the form of a tilt of the device of the user, the direction of tilt being indicative of the direction of the user input. For example, the tilt may be a right hand side tilt or a left hand side tilt. At 814, the angle of user input is determined. For example, for a rotational user input, the angle may be the angle by which the ring, dial or other rotational input has rotated with respect to its initial position. Similarly, for example, for a tilt input the angle of tilt with respect to the initial position may be determined. At 816, the rate of the user input is determined.

At 818, one or more events are selected from the plurality of stored past, current, and future events based on the determined direction, angle and/or rate of the user input and further based on the determined context. For example, if the direction of rotational input is clockwise or the direction of tilt input is towards the right hand, a subset of the future events is selected from the n-tuple vector space of the plurality of past, current, and future events. The determined angle of user input causes selection of a sub-subset of the selected subset of the future events. Alternatively or in addition, the determined rate of user input may be used to select a few future events from the selected subset of future event or a few future events from the selected sub-subset of the subset of the future events. A final selection out of this selected subset or sub-subset is made based on the determined current context. A heuristic algorithm may be used to determine the relevant events from the selected subset or sub-subset based on the determined current context.

It may be noted that while during the capturing phase, events may be captured as current events, when stored they form part of the past events or future events (e.g., car location may be shown as a future location when walking out of a building). For example, during a meeting, while participants are introducing themselves, these events are captured as current events with time stamps, associated image data, audio data and other context data. However, as soon as an introduction of a given participant is over, and the next participant begins an introduction, the data relating to the preceding participant is stored as a past event data.

As regards selection of past events, a process similar to the process discussed earlier for selecting future events is followed with the difference that, for example, an anticlockwise rotational input or left hand side tilt input cause selection of relevant past events.

At 820, at least some of the selected events may be displayed in a user interface of the device of the user. Alternatively and/or in addition, the selected events may be presented on the device of the user by other means (e.g., via a speaker).

Turning now to FIG. 9, an exemplary flowchart illustrates a method for obtaining and taking action on a selected event. The method starts at 902. The current context of the user and/or the device of the user is determined at 904.

Whether a user input has been received to select one or more events from the plurality of past, current, and future events based on the determined current context is checked at 906. For example it may be iteratively checked if the user input has been received as shown by the arrow "NO" that loops back to the determination of the current context in the absence of receipt of any user input. If a user input is received, for example in the form of rotating a ring or a dial, or a rotational gesture input or a rotational touch input, or a tilt input, at 908 the direction of the input is determined. For example, the mobile computing device 702 determines whether the direction of rotational input is clockwise or anticlockwise. In some examples, the user input may be in the form of a tilt of the device of the user, the direction of tilt being indicative of the direction of the user input. For example, the tilt may be a right hand side tilt or a left hand side tilt. At 910, the rate of the user input is determined.

At 912, the angle of user input is determined. For example, for a rotational user input, the angle may be the angle by which the ring, dial or other rotational input has rotated with respect to its initial position. Similarly, for example, for a tilt input the angle of tilt with respect to the initial position may be determined.

At 914, the mobile computing device 702 checks if the direction of user input is clockwise. In examples, where the user input is a tilt of the device of the user, the mobile computing device 702 may check if the direction of tilt is towards the right hand side. In these examples, it is assumed that the clockwise rotational input or the right hand tilt input causes retrieval of future events. However, in other examples, an anticlockwise rotational input or a left hand tilt input may cause retrieval of future events. The correspondence between the direction of rotation and retrieval of future or past events may be user-configurable.

If the direction of the rotational input is clockwise or the direction of tilt input (in examples where the user input is in the form of tilt of the device of the user) is towards the right hand side, one or more future events are selected based on the angle of rotation and/or the rate of rotation of the user input at 916. In examples where the rate of user input is used, alternatively or in addition, in selecting the one or more future events, the granularity and/or the number of the selected events may be a function of the rate of user input as discussed earlier.

If the direction of the rotational input is anticlockwise or the direction of tilt input (in examples where the user input is in the form of tilt of the device of the user) is towards left hand, one or more past events are selected based on the angle of rotation and/or the rate of rotation of the user input at 924. In examples where the rate of user input is used, alternatively or in addition, in selecting the one or more past events, the granularity and/or the number of the selected events may be a function of the rate of user input as discussed earlier.

At 920, action is taken on at least one of the selected events. For example, for a selected future event, such as a planned visit to a cinema hall for a movie, action to purchase online tickets may be taken. As another example for an overdue payment of a credit card bill, retrieved as a past event, online payment action may be taken.

As shown in dotted lines, optionally at 918, the selected one or more events may be displayed before an action is taken on at least one of the selected events.

The process ends at 922.

Referring next to FIG. 10, an exemplary flowchart illustrates another method for obtaining and displaying a selected event. The method starts at 1002. The current context of the user and/or the device of the user is determined at 1004.

Whether a user input has been received to select one or more events from the plurality of past, current, and future events based on the determined current context is checked at 1006. For example, the mobile computing device 702 may iteratively check if the user input has been received as shown by the arrow "NO" that loops back to the determination of the current context in the absence of receipt of any user input. If a user input is received, for example in the form of rotating a ring or a dial, or a rotational gesture input or a rotational touch input, or a tilt input, at 1008 the direction of the input is determined. For example, the mobile computing device 702 determines whether the direction of rotational input is clockwise or anticlockwise. In some examples, the user input may be in the form of a tilt of the device of the user, the direction of tilt being indicative of the direction of the user input. For example, the tilt may be a right hand side tilt or a left hand side tilt. At 1010, the rate of the user input is determined.

At 1012, the angle of user input is determined. For example, for a rotational user input, the angle may be the angle by which the ring, dial or other rotational input has rotated with respect to its initial position. Similarly, for example, for a tilt input the angle of tilt with respect to the initial position may be determined.

At 1014, the mobile computing device 702 checks if the direction of user input is clockwise. In examples, where the user input is a tilt of the device of the user, the mobile computing device 702 may check if the direction of tilt is towards the right hand side. In these examples, it is assumed that the clockwise rotational input or the right hand tilt input causes retrieval of future events. However, in other examples, an anticlockwise rotational input or a left hand tilt input may cause retrieval of future events.

If the direction of the rotational input is clockwise or the direction of tilt input (in examples where the user input is in the form of tilt of the device of the user) is towards the right hand side, one or more future events are selected based on the angle of rotation and/or the rate of rotation of the user input at 1016. In examples where the rate of user input is used, alternatively or in addition, in selecting the one or more future events, the granularity and the number of the selected events may be a function of the rate of user input as discussed earlier.

If the direction of the rotational input is anticlockwise or the direction of tilt input is towards left hand (in examples where the user input is in the form of tilt of the device of the user), one or more past events are selected based on the angle of rotation and/or the rate of rotation of the user input at 1026. In examples where the rate of user input is used, alternatively or in addition, in selecting the one or more past events, the granularity and/or the number of the selected events may be a function of the rate of user input as discussed earlier.

At 1018, at least one of the selected one or more events is displayed on a user interface of the device of the user. The method ends at 1024.

However, at any point during the operations shown in FIG. 10, if the user wishes to quickly get back to the present, they may provide a suitable input such as fast reverse rotation input, e.g., if turning clockwise, a quick anticlockwise flick and vice-versa. Further, the user may shake their device to return to the present. Other methods of quick return to the present may be used.

As shown in dotted lines, optionally at 1020, the mobile computing device 702 may check if any further user input has been received for taking action on one or more of the displayed events. If this option is followed then, at 1022 suitable action on the at least one of the displayed event is taken in accordance with the received further user input, and the method ends at 1024. However, if no further user input is received the method ends at 1024 without taking any action.

Turning now to FIG. 11A, an exemplary schematic diagram of an example scenario illustrates a few exemplary events and/or contexts that may be captured. At 1102, events from a calendar application and events relating to people in a contact list or the like are shown as events that may be captured. At 1104 an event of a person making an introduction is shown as an event that may be captured. In this example, the voice of the person together with a photo of that person may be stored. A multi-array microphone not only captures the voice, but is also able to detect the direction of the source of the voice and enables an RGB camera to focus on the source of the voice for capturing the photo and the smart watch 1126 interpreting the gestures in the photo as a person making an introduction. Such an event may be recorded as an image and audio, and/or a speech recognition engine may recognize the audio, convert the audio into a text and annotate the image with the text.

The location of a device of the user is captured at 1106, using for example, a GPS receiver and/or other methods such as signals from multiple cellular base stations and/or multiple Wi-Fi hotspots, and/or a mapping application. As discussed earlier, location may be one of the components of the context of the user and/or the device of the user. At 1108, audio clues are captured both as a part of the context and events. For example, the voice of a person making an introduction may be stored as an event, while other audio may give a clue to the ambience and surrounding such as an opera house, a theater, a cinema hall, a shopping center, a classroom, a living room and the like, and may facilitate determination of the current context of the user and/or device of the user.

Referring now to FIG. 11B, an exemplary schematic diagram illustrates an example of the device 1126 of the user capturing the events and deciding where to store events. As discussed above in connection with FIG. 11A, the device 1126 (e.g. a wearable device such as a smart watch) continuously looks for existing clues to capture events and contexts. Based on the existing clues, the device 1126 decides, as shown at 1120, where the captured data should be stored. For example, as shown at 1122, the device 1126 decides what data should be stored as past events in history. For example, while parking a car in the office in the morning upon arriving at the office, the location of the car in the parking bay may be stored as a past event with its time stamp and associated context. Similarly, during a meeting in the office, the initial introductions in the meeting by the participants may be stored as past events with time stamps and associated context. As discussed above, while these events are current events when they occur, they pass into history after being stored. However, some other data may be stored, as shown at 1124, as future events. For example, just before the end of the meeting, if a decision about date, time and venue of the next meeting is taken, this event is stored as a future event. Similarly, if during the course of the day in office, a text message from a friend is received to the effect that milk should be picked up on the way home, this message or a summary thereof, may be stored as a future event.

Referring next to FIG. 12A-12C, exemplary schematic diagrams illustrate an example method of retrieving a past event. As discussed herein, a ring or a dial on a wearable device of a user may be rotated, for example in anticlockwise direction, to retrieve a context-dependent past event. An exemplary ring on a smart watch is shown in FIG. 12A at 1202. The ring is shown gripped by the fingers of the user in FIG. 12B at 1204. The ring is shown as being rotated in an anticlockwise direction in FIG. 12C at 1206 to obtain one or more context-dependent past events. However, other methods or means for providing user input may be used. For example a rotational gesture may be used. As another example, rotational touch input may be given by touching the dial of the smart watch by fingers and then rotating the fingers in an anticlockwise direction. As another example, the smart watch may be tilted or shaken in a particular way. For example, a left hand side tilt may provide an input to retrieve context-dependent relevant past event(s), and a right hand side tilt may provide an input to retrieve context-dependent relevant future event(s). As another example, a shaking of the smart watch from the left to the right may provide a user input to retrieve future event(s). Similarly, a shaking of the smart watch from the right to the left may provide a user input to retrieve past event(s).

Turning now to FIG. 13, an exemplary schematic diagram illustrates an example of a retrieved past event based on a current context. At 1302, the face of a participant is shown as retrieved when, for example, another participant, who might have forgotten who a particular participant is, rotates the ring 1202 in an anticlockwise direction to obtain the image and the name of that participant. In this case, because the watch is aware of the current context namely the meeting that is in progress, the watch retrieves the images of participants in the meeting together with their names. The participant who wanted to know who a particular participant is, continues to rotate the ring 1202 until the participant in question is displayed with the participant name in audio and/or annotated as text on the image. Thus, a context-dependent event is easily retrieved.

Referring next to FIG. 14, an exemplary schematic diagram illustrates an example of a different retrieved past event based on a different current context. For example, at the end of the working hours in the office, the same meeting participant for whom a past event of displaying an image of a particular participant in a current meeting was retrieved as a past context-dependent event now wants to know as to where the participant parked the car in the parking bay. In this case, when the person rotates the ring 1202, the device 1126 (e.g., a smart watch) displays a car as being parked at location C 23, 200 feet away. In one example, the user may take further action to get the car emit a beep to indicate its location. For example, the user may rotate the ring 1202 further to take an action on this displayed event. Alternatively, a gesture may be input to take action, or the displayed input may be touched to take appropriate action, or one or more physical elements of the computing device 702 may be pressed (e.g., a button) to take appropriate action. In some examples, the button may be a virtual button. Other forms of user inputs to activate a displayed event are within the scope of the disclosure.

Additional Examples

In one example, while at least one of the selected one or more events may be provided for display, some other of the selected one or more events may not be provided for display but action may be taken on at least one of those events that were selected but were not provided for display.

In some examples, the computing device 702 includes security elements such as a fingerprint reader to authenticate the user 742 before any action on an event is taken or an event is activated.

In one example scenario, while sitting in a meeting, if a participant wants to see an earlier slide of a presentation, the participant may rotate the ring 1202 to see all the slides that have been presented so far. In some examples, the smart watch 1126 may be in communication with a mobile telephone, and while snippets of the slide may be displayed on the smart watch 1126, the detailed slides may be displayed on the mobile phone.

In another example scenario, if a user walks out of a mall after shopping, and the user came to the mall by a subway train, rotating ring 1202 clockwise may indicate the next available subway train home. As another example, if the user has an appointment to meet someone in ten minutes, rotating the ring 1202 clockwise may cause that appointment to be displayed. Additional input to indicate the place of the meeting may show the rendezvous location. It may be noted that the user may have another appointment with someone the next day, but a relevant current context-dependent appointment is retrieved for display rather a distant one. In this way, the user need not revert to a calendar application to see all the tasks or appointments for a certain period, rather a most relevant near future task or appointment is displayed on the smart watch 1126.

In another example, if a student is taking notes in a class on a device, the student may select a text and command the smart watch 1126 to display earlier notes related to that text. If the smart watch is in communication with the device, a short summary of the related notes may be shown on the smart watch 1126, while the details may be shown on the device of the student. Further, the student may select a word and the smart watch may show a dictionary meaning and/or a thesaurus providing synonyms and antonyms.

As another example, a student who rode to school on a bike may be able to lock the bike as a future action, after parking the bike. At the end the classes, a command to retrieve a past event may show the location of the bike where it is parked, while a subsequent command may unlock the bike. Thus, the examples of the disclosure given herein and those not specifically given but within the scope of the disclosure, enable users to retrieve the most relevant events from a myriad events in a natural and intuitive fashion and the system retrieves a relevant event after determining the current context of the user.

In another example scenario, when a laptop of a writer is tethered to a smart watch 1126, if the writer has updated a paragraph currently, moving the ring 1202 anticlockwise may show the writer a previous version of the paragraph.

The smart watch 1126 may also be used to continuously monitor the blood pressure and heart rate of a wearer. In such cases, while walking as a part of an exercise, moving the ring 1202 backwards may show how much the user has walked and how blood pressure and/or heart rate has changed. In such a scenario, moving the ring 1202 forward may suggest how much more the user should walk before taking a break.

In some examples, an "Undo" feature may be available on a smart watch. For example, while a command for a relevant past event in a meeting may display a previous slide, an undo command may begin showing the current time and the balance time for which the meeting is scheduled to continue. Similarly, in the example of the student unlocking a bike, an undo command may re-lock the bike.

Alternatively or in addition to the other examples described herein, examples include any combination of the following:

displaying on the wearable device at least one context-dependent past event upon determining that the direction of the rotational input is anticlockwise; or displaying on the wearable device at least one context-dependent future event upon determining that the direction of the rotational input is clockwise.

providing information associated with at least one past event associated with a current event.

providing a recommendation for activating the context-dependent future event.

storing a plurality of events with their corresponding time stamps and associated contexts, and selecting the one or more of the plurality of events based on the time stamps and the associated contexts.

determining a rate of a rotational input, and determining a granularity of selecting the one or more of the plurality of events based on the determined rate of the rotational input.

storing at least a part of data associated with the plurality of events and contexts on the wearable device and at least another part of the data on a cloud service, the wearable device being in communication with the cloud service directly or via another device.

selecting the one or more of the plurality of events based on the direction of rotation and an angle of rotation of the rotational input.

displaying a continuum of events based on the direction and rate of the rotational input when the angle of rotation is greater than a pre-defined angle and less than another pre-defined angle.

displaying information associated with a retrieved event and performing an action based on further user input, the further user input being based on the displayed information.

displaying a proposed action on the mobile computing device and automatically taking action after a pre-determined time when no additional user input is received.

user input may comprise one of tilting the mobile computing device or moving the mobile computing device or inputting a gesture.

current context is a function of the data collected by the one or more sensors and data received by the mobile computing device from a cloud service.

selecting one or more events from a set comprising past events on determining that the direction of the rotational user input is anticlockwise and selecting one or more events from a set comprising future events on determining that the direction of the rotational user input is clockwise.

At least a portion of the functionality of the various elements shown in FIGS. 8, 9, and 10 may be executed by components shown in FIG. 7, or by an entity (e.g., processor, web service, server, application program, computing device, etc.) not shown in FIG. 7.

In some examples, the operations illustrated in FIGS. 8, 9, and 10 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements, or Application Specific ICs (ASICs) or Field Programmable Gate Arrays (FPGAs).

While the aspects of the disclosure have been described in terms of various examples with their associated operations, a person skilled in the art would appreciate that a combination of operations from any number of different examples is also within scope of the aspects of the disclosure.

The term "tethered" as used herein refers, in some examples, to situations where one device acts as an access point for another device for network access. A tethered connection may occur over a wired connection or a wireless connection. The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when configured to execute the instructions described herein.

The examples illustrated and described herein as well as examples not specifically described herein but within the scope of aspects of the disclosure constitute exemplary means for determining a current context of a user of a wearable device, receiving a rotational input on the wearable device to select one or more of a plurality of events based on the determined current context, the plurality of events comprising past, current and future events, wherein at least a part of a context and at least one of the plurality of events are captured by sensors available on the wearable device, responsive to receiving the rotational input, selecting the one or more of the plurality of events based on the determined current context and a direction of rotation of the rotational input, and displaying on the wearable device at least one of the selected one or more of the plurality of events.

For example, one or more of the elements illustrated in FIG. 7, such as the input magnitude determination component, input direction determination component, input rate determination component, context determination component, event selection component, user interface component, event activation component, and communication interface component, when encoded to perform the operations illustrated in FIGS. 8, 9, and 10, constitute exemplary means for determining a current context of a user of a wearable device, exemplary means for receiving a rotational input on the wearable device to select one or more of a plurality of events based on the determined current context, the plurality of events comprising past, current and future events, exemplary means for selecting the one or more of the plurality of events based on the determined current context and a direction of rotation of the rotational input, and exemplary means for displaying on the wearable device at least one of the selected one or more of the plurality of events.

Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip (SOC) implementations, complex programmable logic devices (CPLDs), etc.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C." The phrases "at least one", "one or more" and "and/or" are open ended expressions that are both conjunctive and disjunctive. For example "at least one of A, B, and C", "at least one of A, B, or C" and "A, B, and/or C" means A alone, B alone, C alone, A and B together, A and C together, B and C together and A, B, and C together.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative but not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for displaying one or more of context-dependent, past, current and future events on a wearable device, the method comprising:
    determining, by a processor, a current context of a user of the wearable device;
    receiving, by a processor, a rotational input on the wearable device for selection of one or more of a plurality of events based on the determined current context, the plurality of events comprising one or more of past, current and future events, wherein at least a part of the current context is captured by sensors available on the wearable device;
    responsive to receiving the rotational input, determining a rate of the rotational input and a number and granularity of the one or more events to be selected based on the determined rate of rotational input;
    selecting, by a processor, the one or more events based on the determined current context, the determined rate of the rotational input, the determined number and granularity, and a magnitude of the rotational input; and
    providing on the wearable device a representation of at least one of the selected one or more of the plurality of events.

2. The method of claim 1, further comprising:
    displaying on the wearable device at least one context-dependent past event upon determining that a direction of the rotational input is anticlockwise; or
    displaying on the wearable device at least one context-dependent future event upon determining that the direction of the rotational input is clockwise.

3. The method of claim 2, wherein providing on the wearable device the representation of the context-dependent past event comprises providing information associated with at least one past event associated with a current event.

4. The method of claim 2, wherein providing on the wearable device the representation of the context-dependent future event comprises providing a recommendation for activating the context-dependent future event.

5. The method of claim 1, further comprising storing the plurality of events with their corresponding time stamps and associated contexts, wherein selecting the one or more events comprises selecting the one or more events based on the time stamps and the associated contexts.

6. The method of claim 1, wherein the rotational input comprises one of rotating a ring associated with the wearable device, inputting a rotational gesture, or providing a touch input.

7. The method of claim 1, wherein at least a part of data associated with the plurality of events and contexts is stored on the wearable device and at least another part of the data is stored on a cloud service, the wearable device being in communication with the cloud service directly or via another device.

8. The method of claim 1, wherein selecting the one or more events comprises selecting the one or more events based on a direction of the rotational input.

9. The method of claim 8, further comprising displaying a continuum of events based on the direction and rate of the rotational input, and based on the magnitude of the rotational input being greater than a pre-defined angle and less than another pre-defined angle.

10. The method of claim 1, wherein the current context comprises one or more of a location, an environment, a time of the day, a date, an ambience, a surrounding, a proximity with a set of pre-defined persons, a mode of locomotion, and a state of the wearable device.

11. The method of claim 1, further comprising receiving, by the processor, additional input, and displaying additional information of the at least one of the selected one or more of the plurality of events.

12. A system for performing an action associated with one or more events based on a current context, the system comprising:
    a mobile computing device having one or more sensors for collecting data associated with the current context;
    a memory area for storing data associated with a context, and data associated with the plurality of events; and
    a processor programmed to:
        receive rotational user input to retrieve data associated with at least one of the plurality of events stored in the memory area based on the current context;
        determine a rate of the rotational user input and a number and granularity of the at least one of the plurality of events based on the determined rate of the rotational user input;
        retrieve the data associated with the at least one of the plurality of events from the memory area based on the determined rate of the rotational user input and the determined number and granularity; and
        perform an action associated with the retrieved data based on the current context and the determined rate of the rotational user input.

13. The system of claim 12, wherein performing the action comprises displaying information associated with the retrieved data and performing an action based on further user input, the further user input being based on the displayed information.

14. The system of claim 12, wherein the user input comprises one of tilting the mobile computing device, moving the mobile computing device, inputting a gesture, or providing a touch input.

15. The system of claim 12, wherein performing the action comprises displaying a proposed action on the mobile computing device and automatically taking action after a pre-determined time if no additional user input is received.

16. The system of claim 12, wherein the current context is a function of the data collected by the one or more sensors and data received by the mobile computing device from a cloud service.

17. One or more computer storage media storing processor-executable components, said components comprising:
- a user interface component, which upon execution by at least one processor causes the at least one processor to receive a rotational user input to retrieve at least one of a plurality of events that is based on a current context;
- a context determination component, which upon execution by at least one processor causes the at least one processor to determine a current context in which the rotational user input was received;
- a communication interface component, which upon execution by at least one processor causes the at least one processor to access a plurality of one or more of past, current, and future events stored on a cloud service;
- an input rate determination component, which upon execution by at least one processor causes the at least one processor to determine a rate of rotational user input and a quantity and granularity of the one or more events to be selected based on the determined rate of rotational user input; and
- an event selection component, which upon execution by at least one processor causes the at least one processor to selects one or more events from the accessed plurality of the one or more of past, current, and future events based on a determined direction, a determined magnitude of the rotational user input, the determined current context, the determined rate of rotational user input, and the determined number and granularity, wherein at least one of the selected one or more events is displayed by the user interface component upon execution by the processor.

18. The computer storage media of claim 17, wherein the selected one or more events are selected from a set comprising past events on determining that the direction of the rotational user input is anticlockwise.

19. The computer storage media of claim 17, wherein the selected one or more events are selected from a set comprising future events on determining that the direction of the rotational user input is clockwise.

20. The computer storage media of claim 17, wherein the current context is a function of data collected by one or more sensors and data received from a cloud service.

* * * * *